July 16, 1963 T. H. FLOWERS 3,098,218
BINARY DIGITAL NUMBER STORING AND ACCUMULATING APPARATUS
Filed Aug. 17, 1961 4 Sheets-Sheet 1

INVENTOR
THOMAS H. FLOWERS,
By Hall & Houghton.
Attorney.

BINARY DIGITAL NUMBER STORING AND ACCUMULATING APPARATUS

Filed Aug. 17, 1961 4 Sheets-Sheet 2

INVENTOR
THOMAS H. FLOWERS,
By [signature]
Attorney.

BINARY DIGITAL NUMBER STORING AND ACCUMULATING APPARATUS

Filed Aug. 17, 1961 4 Sheets-Sheet 3

INVENTOR
THOMAS H. FLOWERS,
By Hall & Houghton
Attorney.

INVENTOR
THOMAS H. FLOWERS
By Hall & Houghton
Attorney.

3,098,218

BINARY DIGITAL NUMBER STORING AND ACCUMULATING APPARATUS

Thomas Harold Flowers, Mill Hill, London, England, assignor to Her Majesty's Postmaster General, London, England Filed Aug. 17, 1961, Ser. No. 132,048
Claims priority, application Great Britain Aug. 22, 1960
12 Claims. (Cl. 340—174)

Figure 1:
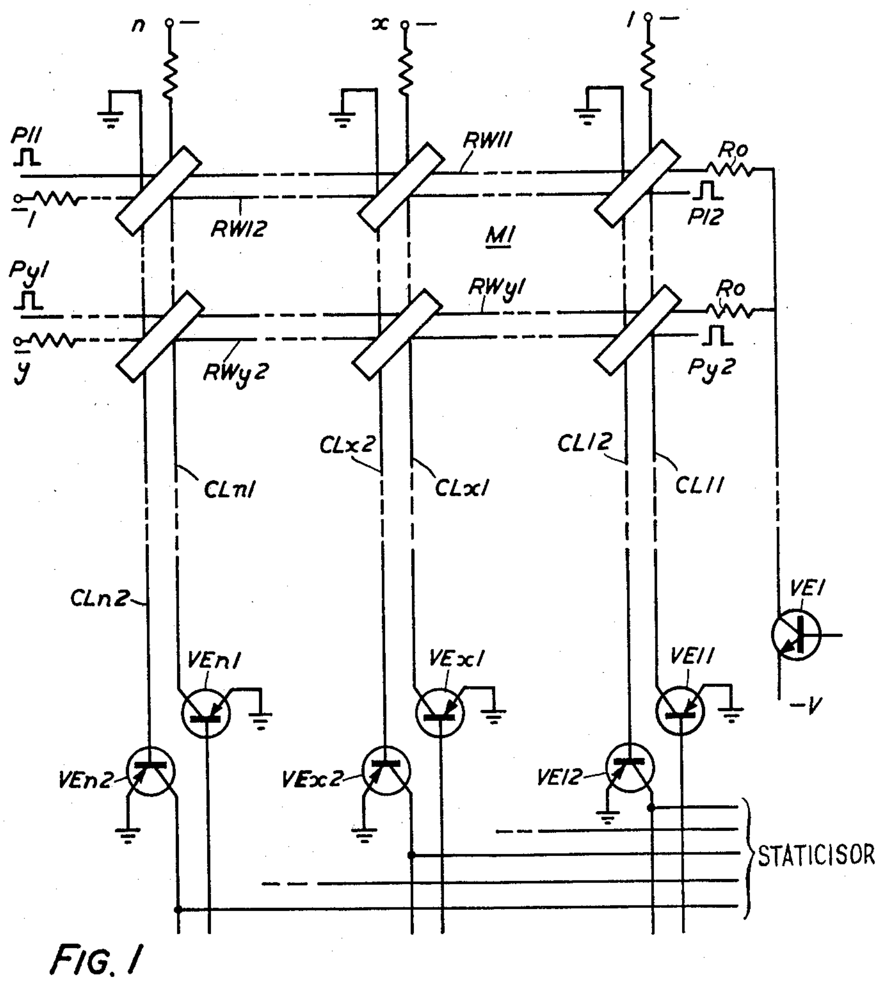
Figure 5:
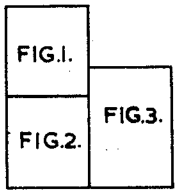

This invention relates to binary digital number storing and accumulating apparatus in which the recorded total can be advanced one unit at a time by pulses supplied from a source of pulses to be counted and in which the number recorded can be read out on demand. More particularly the invention relates to binary digital storing and accumulating apparatus having a plurality of recording positions whereby a plurality of separate binary numbers may be independently stored, advanced or read-out. Apparatus in accordance with the invention is suitable for use, for example, in telephone exchanges for recording charges incurred by subscribers but its application is not restricted to such use.

It is a known feature of the binary scale that if a unit is added to a number expressed in binary notation, the notation of the sum is derived in the following manner:

Beginning with the least significant digit, the digits are reversed in turn (i.e. 0 is substituted for 1 and 1 is substituted for 0) until a 0 is encountered in the original number; remaining digits of higher order are then left unchanged. In apparatus according to the present invention, means whereby a unit is added to a stored number utilises this feature and the apparatus is so constructed that when a unit is to be added to a stored number that number is removed, or read-out, from the store and subsequently reinserted into the store with all digits reversed up to and including the first zero in the original number, counting from the least significant digit, the remaining higher order digits being left unchanged.

Binary digital number storing and accumulating apparatus, in accordance with the invention, includes a matrix of rectangular-hysteresis-loop magnetic cores capable of being set in either one of two opposite states of magnetic saturation to indicate a first binary digit stored or a second binary digit stored respectively, the matrix containing for each number to be stored a row of magnetic cores, each core in a row corresponding to a different order digit of the number; the cores in respective rows in the matrix having row-write windings connected in series in a like sense, and also having row-read-out windings connected in series in a like sense; matrix cores corresponding to the same order digit in the several rows arranged in respective columns, the matrix cores in the respective columns having column-write windings connected in series in a like sense, and also having out-put windings connected in series in a like sense; first and second two-condition devices operatively associated with respective matrix columns, means for applying a pulse to all the first and second devices at a first pulse time to set those devices in a first of the two conditions; third, fourth and fifth two-condition devices operatively associated with respective matrix columns, means for applying a pulse to all the third, fourth and fifth devices at the first pulse time for setting those devices in the first of the two conditions when a unit is to be added to a number stored in a particular matrix row, and means for applying a pulse to all the third, fourth and fifth devices at the first pulse time to set all those devices in the second of the two conditions when zero is to be added to the number stored in a matrix row; means for application to the row-read-out windings of a matrix row at a second pulse time of a read-out pulse individual to that row for switching to an opposite state those cores in the row which are in a predetermined one of the two states of magnetic saturation to produce a pulse in the output winding of any cores so switched, means for monitoring the electrical condition of the output windings to provide an analogue of the number stored in a particular matrix row to which a read-out pulse is being applied, means for changing from the first condition to the second condition those first and second devices associated with matrix cores of that row which were switched by the read-out pulse and for changing those third, fourth and fifth devices associated with matrix cores of that row corresponding to digits of a higher order than in any core of that matrix row which was switched by the read-out pulse to be changed to the second condition if those devices are not already in that condition, means for changing, at a third pulse time, the condition of any fourth device in the first condition and any fifth device in the second condition, whereby change of any fourth device to the second condition at the third pulse time causes its associated core in that matrix row to be switched to the said predetermined state only if the second device associated with that row core is in the first condition, and if a row-write pulse is applied to the row-write windings of that matrix row at the third pulse time, and whereby change of any fifth device to the first condition, at the third pulse time, causes its associated core in that matrix row to be switched to the said predetermined state only if the first device associated with that core is in the second condition, and if a row-write pulse is applied to the row-write windings of that matrix row at the third pulse time.

The two-condition devices may be rectangular-hysteresis-loop magnetic cores which can be set to a first state of magnetic saturation or to a second state of magnetic saturation opposite to the first state. The change of the magnetic cores between the first and second states of magnetic saturation may be effected by current flow through windings provided on the cores. A core winding is hereinafter defined as being in a "first sense" if current flow through the winding tends to set its associated core in the first state and a core winding is hereinafter defined as being in a "second sense" if current flow through the winding tends to set its associated core in the second state.

In one embodiment of the invention, employing such magnetic cores as two-condition devices, the column write windings of a column of cores, corresponding to the same order of digit in the several rows, are connected via a one-way switch in series with first windings, connected in the first and second senses respectively, on the associated first and second cores, the third, fourth and fifth cores of all the columns have first windings connected together in series in the second sense, second windings connected together in series in the first sense, the fourth and fifth cores of all the columns have third windings, in the second and first senses respectively, connected together in series, the fifth core associated with a particular column has a fourth winding in the first sense connected via a second one-way switch in series with a second winding in the first sense on the associated first core, the third and fourth cores have fourth windings, in the first and second senses respectively, connected in series via third switching means in series with a second winding in the second sense on the associated second core; the output windings of a particular column are connected via a fourth one-way switch in series with third windings in the second sense on the associated first and second cores to the first winding on the associated fifth core at its junction with the first winding of the third core associated with the next higher order digit column; the first and second cores of all the columns also have fourth windings in the first sense connected together in series.

This partcilular embodiment functions in the following manner. It will be assumed that a row core is set in the first state to indicate that a first binary digit is stored in that core, or in the second state to indicate that a second binary digit is stored in that core. At the first pulse time, a pulse applied to the fourth windings on the first and second cores causes those cores to be set in the first state; if a unit is to be added to the number stored in a particular row of cores under consideration a pulse is applied at the first pulse time to the second windings on the third, fourth and fifth cores causing those cores to be set in the first state; if zero is to be added to the number stored in the particular row of cores under consideration a pulse is applied at the first pulse time to the first windings on the third, fourth and fifth cores causing those cores to be set in the second state; at a second pulse time a pulse is applied to the read-out windings of the row of cores under consideration causing all the cores in the row to be set in the first state; current flows in the output windings of those cores changed from the second state to the first state by the read-out pulse, the output current associated with each row core so changed closes the associated fourth switch and current flows through the third windings of the associated first and second cores which cores are thereby changed from the first state, to which they were set at the first pulse time, to the second state, the output current of the affected row cores then flows through the first windings of the third, fourth and fifth cores associted with higher order digits and sets those cores in the second state, if they are not already in that state. At a third pulse time a current pulse is applied to the third windings of the fourth and fifth cores, this current will change any fourth core in the first state to the second state thereby closing the associated third switch causing current flow through the second winding of the associated second core; if this second core is in the first state it will be changed to the second state and the first switch will be closed causing current flow in the column write winding of the associated row core, which current, if it coincides with a pulse on the row-write-winding at the third pulse time, will change that row core back to the second state; if the second core had been in the second state closure of the associated third switch would not have affected the state of that core, no current flow would have taken place in the associated column write winding and the associated row core would have remained in the first state to which it was set at the second pulse time. The current pulse at the third pulse time flowing in the third windings of the fourth and fifth cores will also change any fifth core in the second state to the first state thereby closing the associated second switch causing current flow through the second winding on the associated first core; if this first core is in the second state it will be changed to the first state and its associated first switch will be closed causing current flow in the column write winding of the associated row core, which current. if it coincides with a pulse on the row-write winding at the third pulse time, will change that row core back to the second state; if this first core had been in the first state, closure of the associated second switch would not have affected the state of that core, no current flow would have taken place in the associated column write winding and the associated row core would have remained in the first state to which it was set at the second pulse time. In order that the number read-out from any row of cores at a given second pulse time may be recorded, output leads are joined to the junction of each fourth switch with the third windings of the associated fourth switch. When a read-out pulse is applied to windings of a particular row of cores, current flows only in those output leads associated with row cores which have been changed from the second state to the first state.

Conveniently, the switches referred to above may comprise transistors.

Figure 2:
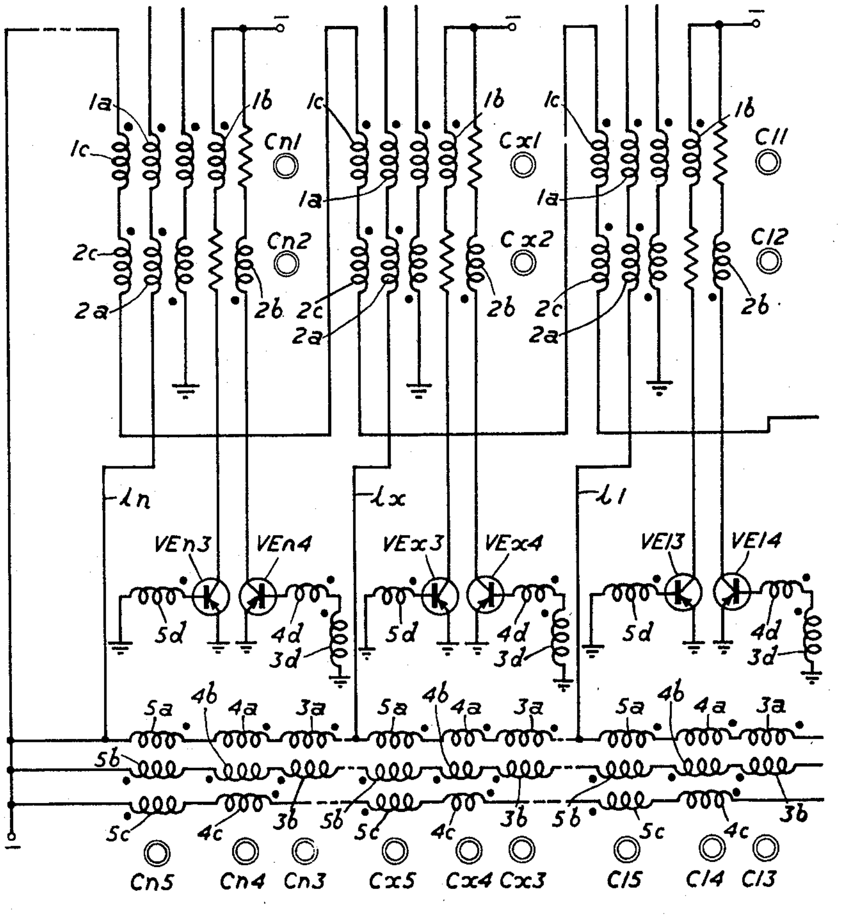
Figure 3:
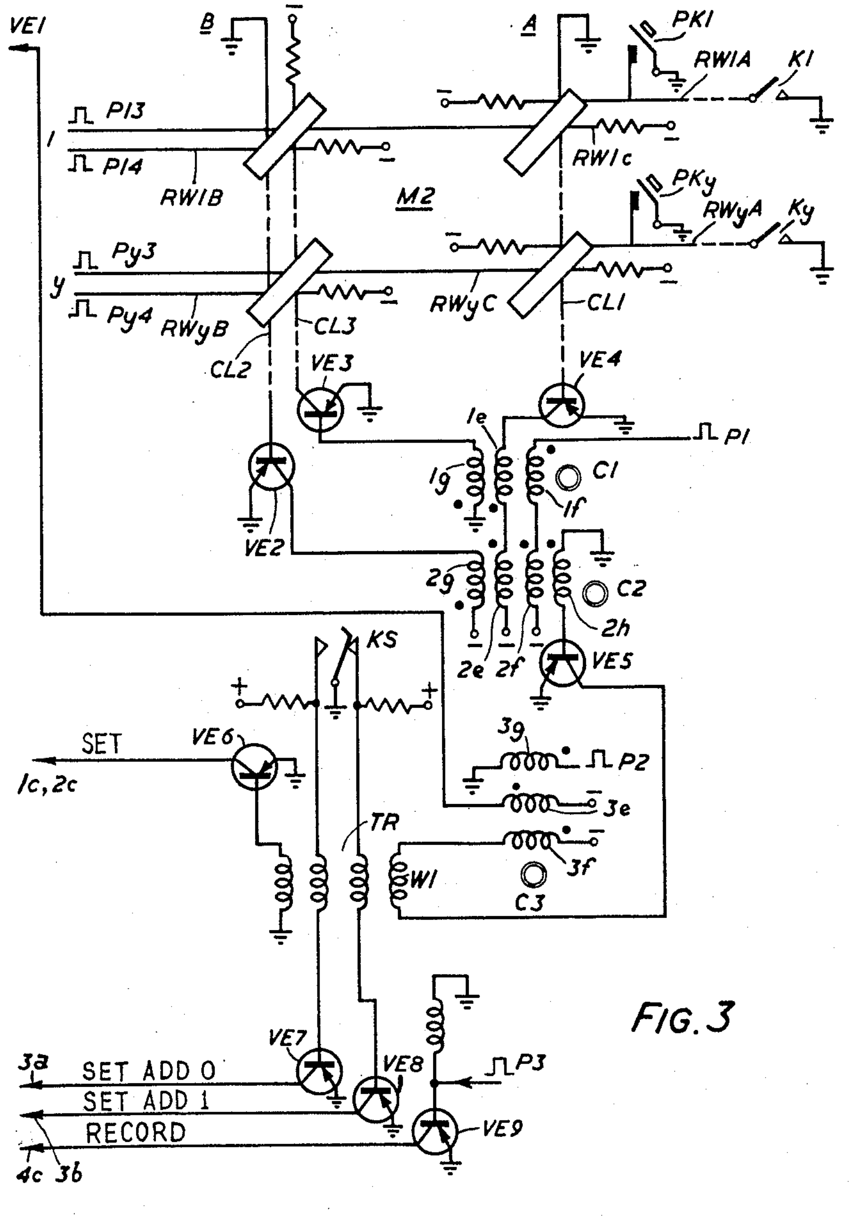
Figure 4:
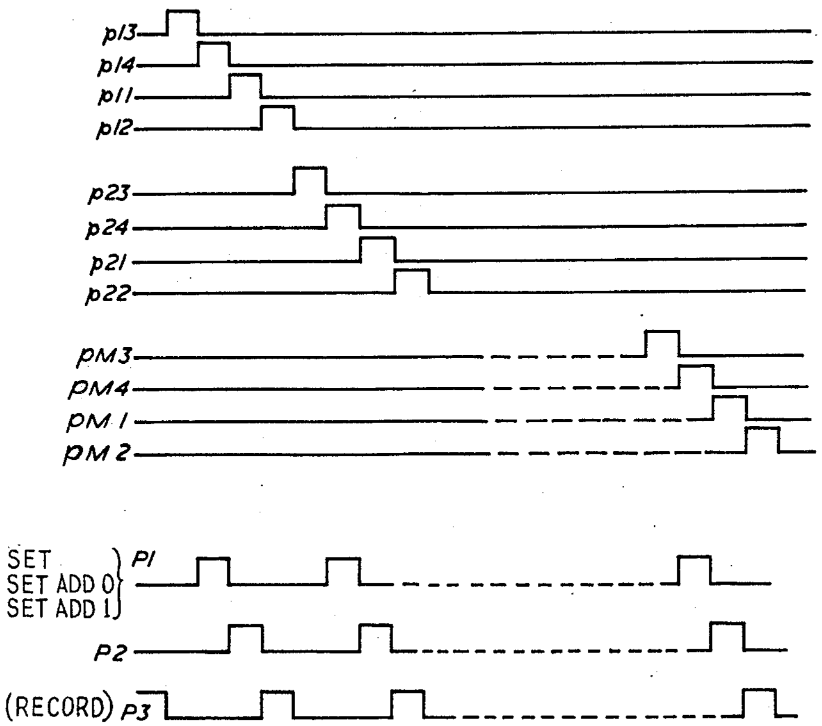

An embodiment of the invention will now be described, by way of example, with reference to the accompanying drawings, which illustrate apparatus suitable for use in a telephone exchange for recording charges incurred by telephone subscribers. In the drawings:

FIG. 1 shows a matrix of magnetic cores, having substantially rectangular-hysteresis-loops, having a plurality of recording positions and arranged to store and accumulate binary digit numbers related to charges incurred by subscribers, FIG. 2 shows a control circuit for the matrix of FIG. 1, FIG. 3 shows a circuit for preparing the control circuit of FIG. 2 to perform a desired operation on the matrix of FIG. 1, FIG. 4 shows relative timings of pulses relating to the circuits of FIGS. 1–3, and FIG. 5 is a key showing the interrelation of FIGS. 1, 2 and 3.

In FIG. 1 the matrix M1 comprises magnetic cores having rectangular-hysteresis-loop characteristics. Each core may be set into a state of magnetic saturation designated a "1" condition or an opposite state of magnetic saturation designated a "0" condition. The matrix M1 is shown as having $m$ rows of cores and $n$ columns; each row constitutes a separate store for a binary number so that $m$ numbers, each number having $n$ digits, can be stored. In FIG. 1, the core corresponding to the least significant digit of each number is at the right-hand end of a row. Each core has two column windings, a "column write" winding and an "output" winding. Each core also has two row windings, a "row-read-out" winding and a "row-write" winding.

The column write windings of respective columns are joined in series by leads such as CL$x$1 for the $x$th column and the output windings of respective columns are joined in series by a further lead such as CL$x$2 for the $x$th column. The row-read-out windings of respective rows are joined in series by leads, such as RW$y$1 for the $y$th row and the row-write windings of respective rows are joined in series by leads, such as RW$y$2 for the $y$th row.

To the row-read-out winding of each row is applied a regularly recurring positive-going pulse individual to the row (P$y$1 for the $y$th row), constituting a "read-out" pulse. These read-out windings are connected via resistors R$o$ to a switch constituted by an npn transistor VE1. The collector of transistor VE1 is connected to the resistors R$o$, the emitter to a negative supply —V and the base also to a negative supply via a winding 3$e$ on a core C3 shown in FIG. 3. The transistor VE1 is normally non-conducting, and in order to read-out a number stored in the $y$th row transistor VE1 must be redered conducting during pulse P$y$1.

To the row-write winding of each row is applied a regularly recurring pulse individual to the row (P$y$2 for the $y$th row) timed to follow immediately the read-out pulse associated with that row. The pulses applied to the row-write windings are "half-write" pulses of an amplitude insufficient to affect the cores unless they coincide with half-write pulses on the column write leads (C1$x$1 for the $x$th column). The second column leads (such as C1$x$2 for the $x$th column) are output leads on which read-out signals appear. When a number stored in the $y$th row is to be read-out a pulse is applied to the base of transistor VE1 coincident with a P$y$1 pulse in consequence of which current flows from the P$y$1 pulse source via the row windings and lead RW$y$1 and transistor VE1. The magnitude of this current is arranged to be sufficient to cause those cores in the $y$th row in the "0" condition to switch to the "1" condition. In practice the current is conveniently 50% greater than the minimum necessary for this purpose. Each core which changes from "0" to "1" delivers an output pulse via its associated output winding to an associated transistor, such as VE$x$2 for the $x$th column, which amplifies the pulse and delivers it to a staticisor and to windings 1a and 2a on first and second cores, such as Cx1 and Cx2 for the xth column, in the control circuit shown in FIG. 2.

At pulse time Py2 immediately following Py1 the number read-out from row y at time Py1 may be reinserted unchanged or may be augmented by "1," as required. At the end of pulse Py1 all cores in the yth row of matrix M1 are in the "1" condition and at time Py2 a half-write pulse is applied to the yth row-write lead. A coincident half-write pulse is applied to the column write leads, such as CLx1, of these cores in the yth row into which a "0" is to be written, the distribution of these pulses over the column write leads being determined in accordance with the number to be written into the row by the apparatus illustrated in FIG. 2.

In the apparatus shown in FIG. 2 there are, for each column of the matrix M1, first and second cores such as Cx1 and Cx2, for the xth column and two transistors, such as VEx3, VEx4 for the xth column and third, fourth and fifth cores, such as Cx3, Cx4 and Cx5 for the xth column. All five cores are of a material having a rectangular-hysteresis-loop. The sense of the windings on these cores is indicated by the dot convention, all windings on any one core being assumed to be wound in the same direction, the dots indicating corresponding ends. Current fed into the dotted end of a winding produces M.M.F. tending to set the core in the condition designated "0," while current leaving the dotted end tends to set the core in the condition designated "1." Cores, such as Cx5, each have a fourth winding 5d in series with the base of an associated transistor, such as VEx3, and cores, such as Cx3, Cx4 each have fourth windings 3d and 4d respectively, in series with the base of a transistor such as VEx4. The fourth winding on a core such as Cx3 is connected in opposite sense to that on a core such as Cx4. Cores, such as Cx3, Cx4, Cx5, each have a first windings, 3a 4a, 5a respectively, all in series in the same sense, through which pulses designated "Set add 0" can be passed to set these cores to the "0" condition, and a second winding 3b, 4b, 5b respectively, through which "Set add 1" pulses can be passed to set these cores to the "1" condition. Cores such as Cx4, Cx5, each have third windings, 4c and 5c respectively, connected in series in opposite senses and through which "Record" pulses can be passed; it is to be noted that cores such as Cx3 do not have third windings. These "Record" pulses cause cores such as Cx4 to be set to "0" and cores such as Cx5 to be set to "1." "Set" pulses, including "Set add 0" and "Set add 1" pulses occur at the times immediately preceding row-read-out pulses, such as occur at pulse time Py1, and "Record" pulses coincide with the row half-write pulses, such as occur at pulse time Py2. A "Record" pulse following a "Set add 0" pulse produces an output from cores such as Cx5 because it changes them from 0 to 1, but no output from cores such as Cx4 because the "Record" winding on those cores is in the same sense as the "Set add 0" winding. Thus the bases of transistors such as VEx3 in these circumstances receive a pulse while those of transistors such as VEx4 do not. Each transistor such as VEx3 delivers a pulse on its collector circuit to a winding 1b on its corresponding core, such as Cx1. Conversely a "Record" pulse following a "Set add 1" pulse (if no other pulse intervenes) produces pulses in the collector circuits of transistors, such as VEx4 and thus in the windings 2b of corresponding cores such as Cx2. At time Py1 the contents of the yth row of matrix M1 is read-out and for each "0" digit of the stored number a pulse is delivered on a corresponding lead, such as 1x connected to windings 1a and 2a of first and second cores Cx1 and Cx2. No pulse is delivered on such leads corresponding to cores in the yth row of M1 set in the "1" condition prior to pulse Py1. Current from any lead such as 1x, is fed into the "Set add 0" lead and flows through the "Set add 0" windings of the third, fourth and fifth cores for all higher order digits setting them to "0" if they are not already in that state. As will be seen this ensures that the higher order digits are unchanged. If at time Py4 there had been a "Set add 0" pulse, all the third, fourth and fifth cores would have been set in the "0" state. But if at time Py4 there had been a "Set add 1" pulse all the third, fourth and fifth cores would have been set in the "1" state. Then at time Py1, reading out the yth row would cause the third, fourth and fifth cores for all digits of higher order than the first zero in the stored number to be switched to "0." The change of state of the fourth cores would tend to make associated transistors, such as VEx4, conduct, but the tendency is opposed by a winding 3d on the third core connected in opposition with winding 4d on the associated fourth core in the base circuit of the transistor.

The operation of the circuits shown in FIGS. 1 and 2 will now be summarised. Each core in the matrix M1 may be in either the "0" or the "1" condition, and it may be required either to read-out a stored number and replace it unmodified, or to add 1 to it. Each core may therefore start from one of two states, and have one of two operations performed on it, so that four situations have to be considered. In addition, if any core is in the "0" condition and a 1 is added to it, all cores representing higher order digits must have their states unchanged.

Considering the xth core in row y of matrix M1:

(a) 0 stored, re-write 0, i.e. add 0 to 0.

(1) At time Py4 a "Set" pulse from a transistor (see FIG. 3) VE6 flowing through windings 1c and 2c sets cores Cx1 and Cx2 to "1" and a "Set add 0" pulse sets cores Cx3, Cx4 and Cx5 to "0."

(2) At time Py1 (immediately following Py4) the read-out pulse Py1 changes the M1 core under consideration (x, y) from "0" to "1" and delivers a pulse on output lead CLx2 causing transistor VEx2 to conduct and set cores Cx1 and Cx2 to "0."

(3) At time Py2 (immediately following Py1) a "Record" pulse sets core Cx5 to 1, which turns on transistor VEx3 and thus sets core Cx1 to "1." Core Cx1 in changing from "0" to "1" turns on transistor VEx1 which sends a half-write pulse through lead CLx1, which pulse, in conjunction with half-write pulse Py2 on lead RWy2 sets the M1 core under consideration to "0."

(b) 1 stored, re-write 1, i.e. add 0 to 1.

(1) As in (a) (1), cores Cx1 and Cx2 are set to "1" and core Cx3, Cx4 and Cx5 are set to "0."

(2) at time Py1 no pulse is delivered on output lead CLx2 since 1 is already stored in the matrix core, and thus cores Cx1 and Cx2 remain set at "1."

(3) At time Py2 a "Record" pulse sets core Cx5 to "1" causing transistor VEx3 to conduct, maintaining core Cx1 in the "1" state. No pulse is delivered to transistor VEx1 and lead CLx1; the next half-write pulse Py2 is insufficient to switch the M1 core which consequently remains in the "1" state.

(c) 1 stored, re-write 0, i.e. add 1 to 1.

(1) At time Py4 a "Set" pulse from VE6 sets cores Cx1 and Cx2 to "1" and a "Set add 1" pulse sets cores Cx3, Cx4 and Cx5 to "1."

(2) At time Py1 no pulse is delivered on output lead CLx2 since 1 is already stored in the matrix core, thus cores Cx1 and Cx2 remain set at "1."

(3) At time Py2 a "Record" pulse changes core Cx4 to "0" turning on transistor VEx4 and setting core Cx2 to "0." Core Cx2 in changing turns on transistor VEx1 and a half-write pulse is delivered on lead CLx1 which in conjunction with half-write pulse Py2 sets "0" into the M1 core.

(d) 0 stored, re-write 1, i.e., add 1 to 0.

(1) At time Py4 cores Cx1, Cx2, Cx3, Cx4 and Cx5 are all set to 1, as in (c) (1) above.

(2) At time Py1 the read-out pulse Py1 changes the M1 core from "0" to "1" and delivers a pulse on output lead CLx2, turning on transistor VEx2 whose collector current sets cores Cx1 and Cx2 to "0." This current flows through lead 1x along the "Set add 0" lead through windings 3a, 4a and 5a of the third, fourth and fifth cores of all the higher order digit positions, (i.e. (x+1) and above), setting those cores back to "0" so that the higher order digits are now treated as in (a) or (b) above accordingly as they have "0" or "1" stored in them, i.e., "0" is added to them although "1" is being added to the digit under consideration (and to others of lower order if any). Transistors, such as VE(x+1)4, of the higher order stages are not turned on by the change of state because the windings 3d and 4d of the third and fourth cores in their base circuits are in opposition.

(3) At time Py2 a "Record" pulse sets core Cx4 into the "0" state and restores the fifth cores of higher order stages to "1." The switching of core Cx4 turns on transistor VEx4 but this has no effect on core Cx2 which is already set at "0." No pulse is delivered to transistor VEx1 so that no change is made in the state of the matrix core which is left in the "1" state into which it was put at stage (2) above.

The means whereby a stored number may be increased by one unit, or may be read-out and re-inserted into the store, will now be described with reference to FIG. 3. A second matrix M2 of cores having rectangular-hysteresis-loops is provided, which cores may be set to a "1" condition or a "0" condition as described relative to the cores of the M1 matrix.

Matrix M2 has only two columns, A and B, but for every row in the M1 matrix there is a corresponding row in the M2 matrix. Each core in column A in the M2 matrix has an individual winding, such as RWyA, for core y, A, in series with a negative supply voltage, a current limiting resistor and a normally open contact, such as Ky. Each core in column B has an individual row-write winding, such as RWyB, for core y, B, through which a pulse at a time, such as Py4 for row y, passes providing a half-write pulse tending to set the core to "1." The cores in each row of matrix M2 also have a further winding joined in series by a lead, such as RWyC for the yth row. Current flows in windings, such as RWyC, at times such as Py3, (one beat ahead of the "Set" pulses previously mentioned) and sets the associated cores to "0."

Each core in column A has a column winding, which windings are joined in series by a lead CL1 in the base circuit of a transistor VE4. The cores in column B have two column windings, the first of which are connected in series by lead CL2 to the base of transistor VE2; the second column windings are connected in series by lead CL3 to the collector of transistor VE3, and also via a current limiting resistor to a negative voltage source.

When it is desired to add 1 to a number stored in a row of the M1 matrix a metering contact K in the corresponding row of matrix M2 is closed. As will be explained, in order to effect the addition the contact K must be closed for at least a specified period so that spurious closures of short duration are of no effect. Connected in parallel with respective metering contacts K are push button operated contacts PK which are used in conjunction with a key switch KS (to be described) when it is desired to read-out a stored number from matrix M1 without modification of the number.

Considering row y of matrix M2, corresponding to row y of matrix M1. When the metering contact Ky is closed, current in the winding RWyA sets its associated matrix core to "1," assuming that there is no current flowing in winding RWyC, common to both cores of the row. When the next Py3 pulse occurs, this matrix core y, A is switched to "0" reverting to "1" when the Py3 pulse ends. The duration of closure of a metering contact Ky must exceed the cycle time of the Py3 pulses. When this matrix core is switched to "0" a voltage is induced in the A column winding of the core and flows in lead CL1 causing transistor VE4 to conduct. At the same time the Py3 pulse switches the column B core in the y row of matrix M2 to "0" if it is already at "1," inducing a voltage in the first B column winding of the core and current flows in lead CL2 causing transistor VE2 to conduct. At time Py4 this second core is set to "1" if transistor VE3 produces a half-write pulse in lead CL3 coincident with half-write pulse Py4 on lead RWyB.

Cores C1 and C2 have rectangular-hysteresis-loops and each has a winding 1e and 2e respectively in the collector circuit of transistor VE4, current in the circuit setting core C1 to "1" and core C2 to "0." Cores C1 and C2 also each have respective windings 1f and 2f connected in series with a source of clock pulses P1 one of which pulses coincides with each pulse, such as Py4. Pulses P1 drive both cores C1 and C2 in the "0" direction. Core C1 is driven to "1" if a meter contact Ky is closed when the corresponding pulse Py3 occurs. The following P1 pulse drives the core C1 back to "0," producing a voltage in a winding 1g which is in the base circuit of transistor VE3. This produces a half-write pulse in lead CL3 which, being coincident with pulse Py4 writes a "1" in the B column core of the yth row. The next Py3 pulse reads the "1" out of the core, producing current in the collector circuit of transistor VE2 and in a winding 2g of core C2 tending to set core C2 to "1." However, the meter contact Ky is still closed and transistor VE4 is conducting, tending to set core C2 to "0," so that there is no change in the state of core C2. Eventually when the meter contact Ky is opened the next Py3 pulse drives the y row cores of matrix M2 to "0," operates the core C1 but not core C2 and a "1" is re-written in the second core in the row, by pulse P1 at time Py4 as previously described, but the A column core of row y is not driven back to "1." On the occurrence of the next Py3 pulse transistor VE2 conducts, but transistor VE4 does not, so that core C2 is driven to the "1" condition. On the next beat the P1 pulse drives core C2 back to the "0" condition and induces a voltage in winding 2h in series with the base circuit of transistor VE5. This transistor then conducts, passing current from its collector through the primary winding W1 of transformer TR and a winding 3f on core C3; this core also has a rectangular-hysteresis-loop. The current pulse in transformer TR produces, via transistors VE6 and VE8, the "Set" and "Set add 1" pulses previously referred to, and 1 is added to the number stored in the yth row of M1 in the manner previously described. The current in winding 3f of core C3 sets it in the "1" condition but this is reversed by pulse P2 flowing through winding 3g which coincides in time with Py1. This reversal produces in winding 3e on C3 a pulse which turns on the transistor VE1 thus providing the path for the Py1 read-out pulse in matrix M1.

Pulse P3 coinciding in time with Py2 follows the P2 and Py1 pulses and causes the collector current of transistor VE9 to provide the "Record" pulse. Since a "Set add 1" pulse was generated at time P1 (Py4) this "Record" pulse causes to be written into the yth row of M1 the number originally stored there, plus one unit.

If it is required to read out a number stored in the yth row of M1 without adding a unit to it, key KS is operated. The push button switch PKy of the yth row in M2 then is operated. The push button switch PKy has the same effect on the A column core in the yth row of M2 as the meter contact Ky, but key KS transfers the pulse from transformer TR at time P1 (Py4) from the "Set add 1" lead via transistor VE8 to the "Set add 0" lead via transistor VE7. Thus when the push button PKy is released the number stored in row y of M1 is read-out into the staticisor and re-written into the row unchanged.

In the control circuit shown in FIG. 2, there may be included in loads $1^1 \ldots 1^x \ldots 1^n$ a winding of between 30 and 40 turns on a rectangular-hysteresis-loop ferrite core. Second windings on respective of these cores are all connected in series to a D.C. source to bias the cores to a suitable magnetic condition. The bias is so chosen that small changes in current flow through windings $1^1$ . . . $1^x$ . . . $1^n$ are not impeded but large changes in current flow are prevented since they switch the core towards a state of magnetic saturation thereby producing an opposing E.M.F. This action protects transistors VE12 . . . VE*x*2 . . . VE*n*2 from damage due to excessive current flow.

Further in the FIG. 2 control circuit a more effective switching of transistors VE12 . . . VE*x*2 . . . VE*n*2 may be obtained by connecting voltage step-up transformers in leads CL12 . . . CL*x*2 . . . CL*n*2.

I claim:

1. Binary digital number storing and accumulating apparatus including a matrix of rectangular-hysteresis-loop magnetic cores capable of being set in either one of two opposite states of magnetic saturation to indicate a first binary digit stored or a second binary digit stored respectively, the matrix containing for each number to be stored a row of magnetic cores, each core in a row corresponding to a different order digit of the number; the cores in respective rows in the matrix having row-write windings connected in series in a like sense, and also having row-read-out windings connected in series in a like sense; matrix cores corresponding to the same order digit in the several rows arranged in respective columns, the matrix cores in the respective columns having column-write windings connected in series in a like sense, and also having output-windings connected in series in a like sense; first and second two-condition devices operatively associated with respective matrix columns, means for applying a pulse to all the first and second devices at a first pulse time to set those devices in a first of the two conditions; third, fourth and fifth two-condition devices operatively associated with respective matrix columns, means for applying a pulse to all the third, fourth and fifth devices at the first pulse time for setting those devices in the first of the two conditions when a unit is to be added to a number stored in a particular matrix row, and means for applying a pulse to all the third, fourth and fifth devices at the first pulse time to set all those devices in the second of the two conditions when zero is to be added to the number stored in a matrix row; means for application to the row-read-out windings of a matrix row at a second pulse time of a read-out pulse individual to that row for switching to an opposite state those cores in the row which are in a predetermined one of the two states of magnetic saturation to produce a pulse in the output winding of any cores so switched, means for monitoring the electrical condition of the output windings to provide an analogue of the number stored in a particular matrix row to which a read-out pulse is being applied, means for changing from the first condition to the second condition those first and second devices associated with matrix cores of that row which were switched by the readout pulse and for changing those third, fourth and fifth devices associated with matrix cores of that row corresponding to digits of a higher order than in any core of that matrix row which was switched by the read-out pulse to be changed to the second condition if those devices are not already in that condition, means for changing, at a third pulse time, the condition of any fourth device in the first condition and any fifth device in the second condition, whereby change of any fourth device to the second condition at the third pulse time causes its associated core in that matrix row to be switched to the said predetermined state only if the second device associated with that row core is in the first condition and if a row-write is applied to the row-write windings of that matrix row at the third pulse time, and whereby change of any fifth device to the first condition, at the third pulse time, causes its associated core in that matrix row to be switched to the said predetermined state only if the first device associated with that core is in the second condition, and if a row-write pulse is applied to the row-write windings of that matrix row at the third pulse time.

2. Binary digital number storing and accumulating apparatus including a matrix of rectangular-hysteresis-loop magnetic cores capable of being set in either one of two opposite states of magnetic saturation to indicate a first binary digit stored or a second binary digit stored respectively, the matrix containing for each number to be stored a row of magnetic cores, each core in a row corresponding to a different order digit of the number; the cores in respective rows in the matrix having row-write windings connected in series in a like sense, and also having row-read-out windings connected in series in a like sense; matrix cores corresponding to the same order digit in the several rows arranged in respective columns, the matrix cores in the respective columns having column-write windings connected in series in a like sense, and also having output windings connected in series in a like sense; for each matrix column first, second, third, fourth and fifth rectangular-hysteresis-loop magnetic cores, capable of being set in either first or second opposite states of magnetic saturation; for each matrix column, first, second, third and fourth normally closed gating devices; column-write windings of respective matrix columns connected in series via their associated first gating devices with first windings, connected in first and second opposite senses respectively on their associated first and second cores; the third, fourth and fifth cores each having first, second, and fourth windings, the fourth and fifth cores further having third windings, the third, fourth and fifth cores each having their first windings all connected together in series in the second sense, having their second windings all connected together in series in the first sense; the fourth and fifth cores having their third windings in the second and first senses respectively all connected together in series; the fifth cores associated with respective matrix columns each having its fourth winding in the first sense connected by the associated second gating device in series with a second winding in the first sense on the associated first core; the third and fourth cores associated with respective matrix columns having their fourth windings connected in the first and second senses respectively in series via the associated third gating device with a second winding in the second sense on the associated second core; the output winding of cores in respective matrix columns connected via their associated fourth gating devices in series with third windings in the second sense on the associated first and second cores and thence to the junction of the first windings on their associated third, fourth and fifth cores with the first windings on the third, fourth and fifth cores of the next higher order digit matrix column; fourth windings in the first sense on the first and second cores all connected together in series; means for applying at a first pulse time a pulse to the fourth winding of all the first and second cores whereby those cores are set in the first state; means for applying a pulse to the first winding of all the third, fourth and fifth cores at the first pulse time if a unit is to be added to a number stored in a matrix row whereby all those cores are set in the first state, and means for applying a pulse to the second windings of all the third, fourth and fifth cores at the first pulse time if zero is to be added to a matrix row whereby those cores are set in the second state; means for applying to the row-read-out windings of a matrix row at a second pulse time a read-out pulse individual to that row whereby matrix cores in that row in a predetermined one of the two states are switched to the opposite state, which switching produces an output pulse in the output winding of any matrix core so switched which output pulse opens the first gating device, switches the associated first and second cores from the first state to the second state and switches to the second state without affecting their associated third gating devices those third, fourth and fifth cores associated with matrix cores corresponding to higher order digits if those third, fourth and fifth cores are not already in the second state; means for applying a pulse at a third pulse time to the third windings on the fourth and fifth cores whereby any fourth core in a first state is switched to the second state and whereby any fifth core in the second state is switched to the first state, change of any fourth core to the second state at the third pulse time causing opening of its associated third gating device whereby its associated second core is switched to the first state if that second core was in the second state, thereby causing application of a pulse to the column-write windings of its associated matrix column which pulse, if it coincides with a row-write pulse applied to the row-write windings of that matrix row switches the matrix core common to that column and row to the said predetermined state; change of any fifth core to the first state at the third pulse time causing opening of its associated second gating device to switch its associated first core to the second state, if that first core was in the first state, and thereby causing application of a pulse to the column-write windings of its associated matrix column which pulse if in coincidence with a row-write pulse applied to the row-write windings of that matrix row switches the matrix core common to that column and row to the said predetermined state.

3. Apparatus according to claim 2, in which the first, second, third and fourth gating devices are transistors; the first transistors having their collectors connected in series with their associated column-write windings, and having their bases connected in series with the first windings on their associated first and second cores; the second transistors having their collectors connected to the second windings on their associated first cores, and having their bases connected to the fourth windings on their associated fifth cores; the third transistors having their collectors connected to the second windings on their associated second cores, and having their bases connected in series with the fourth windings on their associated third and fourth cores; and the fourth transistors having their bases connected in series with the output windings of their associated matrix columns, and having their collectors connected in series with the third windings on their associated first and second cores.

4. Apparatus according to claim 2, including monitoring leads connected to junctions of the output windings of respective matrix columns with their associated fourth gating devices whereby current flow occurs in the monitoring leads upon switching of their associated matrix cores by a read-out pulse, thereby providing an electrical analogue of the number stored in a particular row on application of a read-out pulse to that row.

5. Apparatus according to claim 1 and including a control apparatus for applying at the first pulse times the pulses to the fourth windings of the first and second cores; for selectively applying at the first pulse times the pulse to the first windings of the third, fourth and fifth cores or the pulse to the second windings of the third, fourth and fifth cores; and for applying at the third pulse times pulses to the third windings of the fourth and fifth cores.

6. Apparatus according to claim 5, in which the control apparatus includes a normally closed gating device, the row-read-out windings of all the matrix rows connected to the control apparatus via that gating device, and the control apparatus causing that gating device to open during second pulse times to provide an electrical path for the read-out pulses.

7. Apparatus according to claim 6, in which the gating device comprises a transistor having its collector-emitter path connected in series with the row-read-out windings.

8. Apparatus according to claim 5, in which the control apparatus includes, for each row of the matrix, a normally open switch, closure of a switch causing application by the control apparatus of the pulses at the first pulse time only if that switch is closed for at least a predetermined period.

9. Apparatus according to claim 2, and including a control apparatus for applying at the first pulse times the pulses to the fourth windings of the first and second cores; for selectively applying at the first pulse times the pulse to the first windings of the third, fourth and fifth cores or the pulse to the second windings of the third, fourth and fifth cores; and for applying at the third pulse times pulses to the third windings of the fourth and fifth cores.

10. Apparatus according to claim 9, in which the control apparatus includes a normally closed gating device, the row-read-out windings of all the matrix rows connected to the control apparatus via that gating device, and the control apparatus causing that gating device to open during second pulse times to provide an electrical path for the read-out pulses.

11. Apparatus according to claim 10, in which the gating device comprises a transistor having its collector-emitter path connected in series with the row-read-out windings.

12. Apparatus according to claim 9, in which the control apparatus includes, for each row of the matrix, a normally open switch, closure of a switch causing application by the control apparatus of the pulses at the first pulse time only if that switch is closed for at least a predetermined period.

No references cited.